United States Patent
Ghosh et al.

(10) Patent No.: US 9,546,231 B2
(45) Date of Patent: Jan. 17, 2017

(54) CATALYTIC OLIGOMERIZATION OF OCTENES

(71) Applicant: Reliance Industries Limited, Mumbai (IN)

(72) Inventors: Rajshekhar Ghosh, Gujarat (IN); Ashis Ranjan Bandyopadhyay, Gujarat (IN); Rakshvir Jasra, Gujarat (IN)

(73) Assignee: Reliance Industries Limited, Mumbai (IN)

( * ) Notice: Subject to any disclaimer, the term of this patent is extended or adjusted under 35 U.S.C. 154(b) by 15 days.

(21) Appl. No.: 14/609,913

(22) Filed: Jan. 30, 2015

(65) Prior Publication Data

US 2015/0183901 A1     Jul. 2, 2015

Related U.S. Application Data

(63) Continuation of application No. PCT/IN2013/000431, filed on Jul. 12, 2013.

(30) Foreign Application Priority Data

Jul. 30, 2012   (IN) .......................... 2174/MUM/2012

(51) Int. Cl.
   *C08F 8/04*       (2006.01)
   *C08F 110/14*     (2006.01)

(52) U.S. Cl.
   CPC ............... *C08F 110/14* (2013.01); *C08F 8/04* (2013.01); *C08F 2800/20* (2013.01)

(58) Field of Classification Search
   None
   See application file for complete search history.

(56) References Cited

U.S. PATENT DOCUMENTS

| | | | |
|---|---|---|---|
| 3,733,314 A | 5/1973 | Marwil et al. | |
| 6,395,948 B1 | 5/2002 | Hope et al. | |
| 7,915,889 B2 | 3/2011 | Shintani et al. | |
| 2004/0267070 A1 | 12/2004 | Johnson et al. | |
| 2005/0113621 A1 | 5/2005 | Hope et al. | |
| 2006/0247482 A1 | 11/2006 | Hope et al. | |
| 2008/0306319 A1* | 12/2008 | Earle ............. | B01J 31/0278 585/516 |
| 2009/0156874 A1 | 6/2009 | Patil et al. | |
| 2011/0034743 A1 | 2/2011 | Elomari et al. | |
| 2011/0137091 A1 | 6/2011 | Yang et al. | |

FOREIGN PATENT DOCUMENTS

| | | | |
|---|---|---|---|
| EP | 0047009 | * | 3/1982 |
| GB | 1465870 | * | 3/1972 |
| GB | 1465870 A | | 3/1977 |

OTHER PUBLICATIONS

Aubrey, Journal of Polymer Science: Part A-1, vol. 5, 1191-1201 (1967).*
Ibragimova, Petroleum Chemistry, 2007, vol. 47, No. 1, pp. 61-66.*
Ibragimova M.D., et al.: "Synthesis of oligooctene and oligodecene oils in the presence of chloroaluminate ionic liquids", Petrolium Chemistry, Nauka/Interperiodica, Mo., vol. 47, No. 1, Feb. 1, 2007—Abstract.
International Search Report issued Jan. 28, 2014 in International application No. PCT/IN2013/000431 (3 pages).

* cited by examiner

*Primary Examiner* — Robert C Boyle
(74) *Attorney, Agent, or Firm* — Osha • Liang LLP

(57) ABSTRACT

In accordance with the present disclosure there is provided a process for preparing a hydrogenated olefin polymer by hydrogenation of a polyoctene; said polyoctene being prepared by reacting a $C_8$-olefin feed comprising an isomeric mixture of an alpha-olefin and a non-alpha olefin monomer in a controlled manner with the help of an ionic catalyst, while controlling at least one condition of the reaction selected from the group of condition consisting of exotherm, contact time of the olefin feed with ionic catalyst and molar ratio of the ionic catalyst to the olefin feed within predetermined ranges to obtain an oligomerized mixture comprising at least one polyoctene and unreacted ionic catalyst.

18 Claims, 7 Drawing Sheets

CATALYTIC OLIGOMERIZATION OF OCTENES

CROSS REFERENCE TO RELATED APPLICATIONS

This application is a continuation application of International Application PCT/IN2013/000431, filed on Jul. 12, 2013, which claims the benefit of Indian Patent Application No. 2174/MUM/2012, filed on Jul. 30, 2012. All of these applications are incorporated by reference in their entirety.

FIELD OF THE DISCLOSURE

The present disclosure relates to a process for catalytic oligomerization of olefins. More particularly, the present disclosure relates to a process for the catalytic oligomerization of olefin waste feed.

BACKGROUND

Value addition to a waste olefin feed is one of the biggest challenges for large scale industries. In general practice, the olefin waste feed is blended as fuel in LPG, gasoline, diesel or fuel oil. The olefin by-product stream generated at the polyolefin production plant comprises significant amount of olefins. For example a "polyethylene column residue" generated while manufacturing ethylene-octene copolymer comprises octene at the rate of 7900 kg/day.

Different methodologies have been practiced in prior-art for value-addition to these olefin by-product streams. Catalytic oligomerization of olefins is considered as one of the routes for value addition. Oligomerization is generally carried out on alpha-olefins. The oligomerized products of an alpha-olefin are further processed in variety of forms that include hydrogenated polyalpha-olefins, motor oils, synthetic lubricating oil, hydrogenated polydecenes as emollients, carrier oils in cosmetics, hydrogenated polyisobutenes as emollient and moisturizer.

EXISTING KNOWLEDGE

Large numbers of catalyst systems have been reported for the oligomerization of olefins to obtain desired end-products. These catalysts mainly fall into three distinct classes such as cationic, anionic and free radical. Apart from these, other forms of catalysts such as zeolite and metallocene based catalysts have also been successfully employed.

Besides the above described catalysts, ionic based catalysts have also been successfully employed for the purpose of catalytic oligomerization of olefins, for example United States Patent Application Nos. 20060247482, 20110137091, 20090156874, 2008306319 and U.S. Pat. Nos. 6,395,948, 7,951,889 disclose a process for producing olefin oligomer ranging from $C_2$ to $C_{20}$ using ionic catalyst. The disclosed ionic catalyst is a 2-component catalyst; one component being Lewis acid while the other being quaternary ammonium or phosphonium salt.

Further, United States Patent Application No. 2011034743 discloses a process for oligomerization of pure propylene and/or propylene with other alpha-olefins such as 1-hexene, 1-octene, 1-decene, 1-docene using ionic liquid catalyst. The oligomerized product is further used for preparing base-oil.

United States Patent Application No. 2004267070 discloses a process for the oligomerization of olefins in Fischer-tropsch derived feeds by using a Lewis acid ionic liquid catalyst.

OBJECTS

Some of the objects of the present disclosure are described herein below:

It is an object of the present disclosure to ameliorate one or more problems of the prior art or to at least provide a useful alternative.

It is another object of the present disclosure to provide a process for preparation of a hydrogenated olefin polymer through catalytic oligomerization of an olefin feed.

It is still another object of the present disclosure to provide a cost efficient and simpler process for the catalytic oligomerization of an olefin feed.

It is yet another object of the present disclosure to provide a process for catalytic oligomerization of an olefin feed by employing an easily recoverable and recyclable catalyst.

It is further object of the present disclosure to provide a hydrogenated olefin polymer with good lubricating properties.

It is still further object of the present disclosure to provide a hydrogenated olefin polymer which can be used as an emollient in cosmetic preparation.

Other objects and advantages of the present disclosure will be more apparent from the following description when read in conjunction with the accompanying figures, which are not intended to limit the scope of the present disclosure.

DEFINITIONS

As used in the present specification, the following words and phrases are generally intended to have the meanings as set forth below, except to the extent that the context in which they are used to indicate otherwise.

As used herein the term "olefin feed" in the context of the present disclosure refers to a feed comprising a mixture of olefins having different number of carbon atoms wherein the olefins may be a combination of alpha-olefins and non-alpha olefins.

The term "olefin waste feed" as used in the context of the present disclosure refers to a feed comprising a mixture of an alpha-olefin monomer and non-alpha olefin monomers having the same number of carbon atoms i.e. a mixture of isomeric forms of an olefin.

The term "alpha-olefin" or "1-olefin" as used in the context of the present disclosure refers to an organic compound with a chemical formula $C_nH_{2n}$, having a double bond at primary or alpha location.

The term "non-alpha olefin" as used in the context of the present disclosure refers to an organic compound with a chemical formula $C_nH_{2n}$, having a double bond at position other than 1, such as 2-alkenes and 3-alkenes.

Other objects and advantages of the present disclosure will be more apparent from the following description when read in conjunction with the accompanying drawing, which are not intended to limit the scope of the present disclosure.

BRIEF DESCRIPTION OF ACCOMPANYING DRAWINGS

SUMMARY

Figure 1:
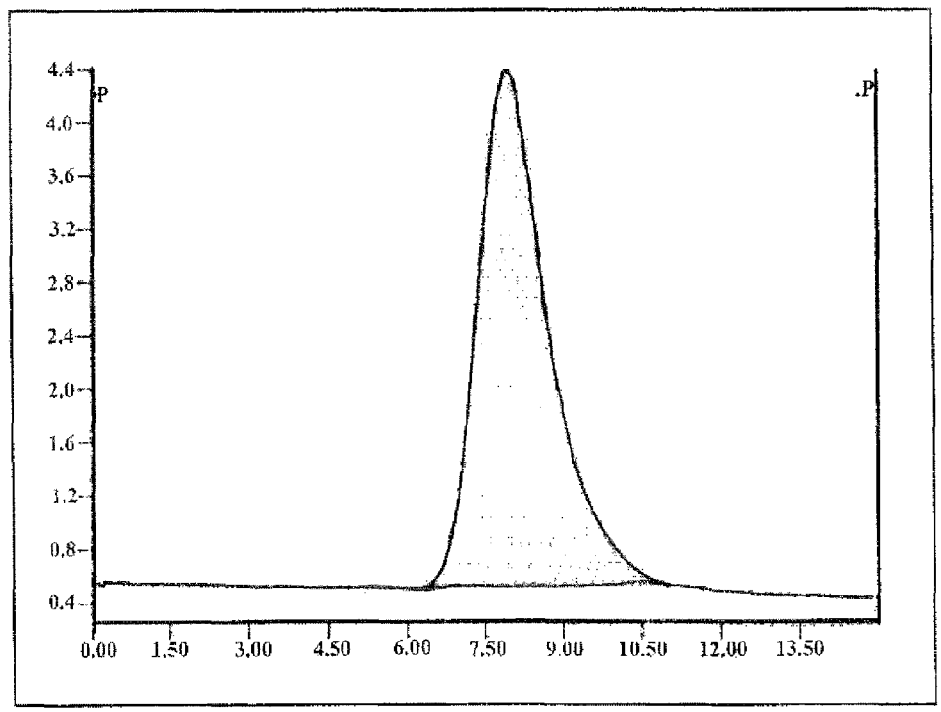
FIG. 1 illustrates a gas permeation chromatography (GPC) to obtain a number avg. molecular weight per mass (Mn), a weight avg. molecular weight per mass (Mw) and poly-dispersity index (PDI) for the hydrogenated olefin polymer of the present disclosure.

In one aspect of the present disclosure there is provided a process for preparing a hydrogenated olefin polymer of Formula (I);

$$(C_8H_{16})nH_2 \quad \text{Formula (I)}$$

wherein, n=2 to 40, preferably 2 to 20; said process comprising the following steps;
i. reacting a $C_8$-olefin feed comprising an isomeric mixture of an alpha-olefin and a non-alpha olefin monomer in a controlled manner with the help of an ionic catalyst, while controlling at least one condition of the reaction selected from the group of condition consisting of exotherm, contact time of the olefin feed with ionic catalyst and molar ratio of the ionic catalyst to the olefin feed within predetermined ranges to obtain an oligomerized mixture comprising at least one polyoctene and unreacted ionic catalyst;
ii. separating the polyoctene from the oligomerized mixture;
iii. purifying the separated polyoctene with the help of an ammonium salt to obtain a purified polyoctene; and
iv. hydrogenating the purified polyoctene in the presence of a hydrogenation catalyst to obtain a hydrogenated olefin polymer of Formula (I).

Typically, the non-alpha olefin is at least one selected from the group consisting of cis-2-octene, trans-2-octene, cis-3-octene and trans-3-octene.

Typically, the amount of the alpha-olefin ranges between 1% and 90% with respect to the total mass of the olefin feed.

Typically, the amount of the non-alpha olefin ranges between 1% and 45% with respect to the total mass of the olefin feed.

Typically, the amount of cis-2-octene, trans-2-octene, cis-3-octene and trans-3-octene present in the feed ranges between 8-22%, 8-25%, 2-5% and 2-6.25%, respectively.

Typically, the ionic catalyst comprises a first component and a second component; wherein the first component is at least one metal halide selected from the group consisting of alkyl halide and alkyl aluminum halide; and wherein the second component is at least one selected from the group consisting of hydrocarbyl substituted ammonium halide, hydrocarbyl substituted imidazolium halide, hydrocarbyl substituted pyridinium halide, hydrocarbyl substituted phosphonium halide, alkylene substituted pyridiniumdihalide, alkyl substituted ammonium halide and alkyl substituted imidazolium halide.

Typically, the alkyl substituted ammonium halide is tri-methylamine hydrochloride.

Typically, the alkyl substituted imidazolium halide is 1-ethyl-3-methyl-imidazolium chloride.

Typically, the ratio of the amount of the first component and the second component ranges between 1:1 and 5:1.

Typically, the ionic catalyst comprises aluminum trichloride as a first component and tri-methylamine hydrochloride as a second component.

Typically, the molar ratio of the olefin feed and the ionic catalyst ranges between 0.01 and 0.1.

Typically, the exotherm is maintained at a temperature ranging between 90° C. and 180° C.

Typically, the exotherm is maintained at a temperature ranging between 100° C. and 160° C.

Typically, the exotherm is maintained below 130° C.

Typically, the contact time of the olefin feed with the ionic catalyst is maintained in the range of 2 to 5 hrs.

Typically, the oligomerized mixture comprises at least one polyoctene having carbon count in the range of 16 to 160.

Typically, the oligomerized mixture comprises at least one polyoctene having carbon count in the range of 32 to 150.

Typically, the oligomerized mixture comprises polyoctene in the range of 82 to 94 wt %.

Typically, the ammonium salt is at least one salt selected from the group consisting of ammonium chloride, ammonium bromide and ammonium hydroxide.

Typically, the hydrogenation comprises a step of reacting the purified polyoctene with a hydrogenation catalyst at a temperature of 130° C. and pressure of 35 bar.

Typically, the hydrogenation catalyst is at least one catalyst selected from the group consisting of palladium on charcoal, palladium on silica or palladium on alumina.

In another aspect of the present disclosure there is provided a hydrogenated olefin polymer of Formula (I)

$$(C_8H_{16})nH_2 \quad \text{Formula (I)}$$

wherein, n=2 to 40, preferably 2 to 20;
wherein said hydrogenated olefin polymer is characterized by the following parameters;
i. a viscosity index greater than 130 at a branch ratio below 0.16;
ii. a kinematic viscosity ranging between 50 centistokes and 65 centistokes at a temperature of 40° C., preferably, 55 centistokes and 61 centistokes; and a kinematic viscosity ranging between 7 centistokes and 10 centistokes at a temperature of 100° C., preferably, 8 centistokes and 9.9 centistokes;
iii. a pour point temperature ranging between −36° C. and −42° C.;
iv. a bromine index ranging between 50 mgBr/100 g and 99.5 mgBr/100 g; preferably 96 mgBr/100 g and 99 mgBr/100 g;
v. a flash point temperature ranging between 150° C. and 250° C.;
vi. a percent short chain branching ranging between 20% and 30%, preferably 25% and 28%; and
vii. a polydispersity index ranging between 2 and 5.

Typically, the hydrogenated olefin polymer is characterized by having carbon count in the range of 16 to 160.

Typically, the hydrogenated olefin polymer is characterized by having carbon count in the range of 32 to 150.

Typically, the hydrogenated olefin polymer is an oligomerized product of a $C_8$-olefin feed comprising an isomeric mixture of an alpha-olefin and a non-alpha olefin monomer, wherein said non-alpha olefin is selected from the group consisting of cis-2-octene, trans-2-octene, cis-3-octene and trans-3-octene;

Typically, the amount of alpha-olefin ranges between 1% and 90% with respect to the total mass of the olefin feed.

Typically, the amount of non-alpha olefin between 1% and 45% with respect to the total mass of the olefin feed.

Typically, the proportion of the amounts of alpha-olefin, cis-2-octene, trans-2-octene, cis-3-octene and trans-3-octene present in the feed ranges between 45-75%, 8-22%, 8-25%, 2-5% and 2-6.25%, respectively.

DETAILED DESCRIPTION

In accordance with the present disclosure there is provided a process for oligomerizing an olefin feed to obtain a polyoctene and then hydrogenating the resulting polyoctene to obtain a hydrogenated olefin polymer of Formula (I) $(C_8H_{16})nH_2$. The afore-stated process of oligomerizing an olefin feed involves reacting a C8-olefin feed comprising an isomeric mixture of an alpha-olefin and a non-alpha olefin monomer in a controlled manner with the help of an ionic catalyst, while controlling at least one condition of the reaction selected from the group of condition consisting of exotherm, contact time of the olefin feed with ionic catalyst and molar ratio of the ionic catalyst to the olefin feed within predetermined ranges to obtain an oligomerized mixture comprising at least one polyoctene and unreacted ionic catalyst.

In accordance with one of the embodiments of the present disclosure, the olefin feed is a by-product stream or a waste feed generated from the polyethylene production plant manufacturing ethylene-octene containing copolymer.

The olefin waste feed as obtained from the polyethylene production plant is a $C_8$ olefin feed that comprises a mixture of $C_8$ alpha-olefin and $C_8$ non-alpha olefin monomers.

Unlike the conventional processes wherein oligomerization of an olefin feed comprising a mixture of olefins having different number of carbon atoms have been reported, the process of the provided disclosure is an oligomerization process of an olefin feed that comprises a mixture of different isomeric forms of an olefin having the same number of carbon atoms.

These isomeric forms can be broadly categorized as alpha-olefin such as 1-octene and non-alpha olefins such as 2-octene and 3-octene. The non-alpha octene such as 2-octene and 3-octene are present in cis and trans-forms such as cis-2-octene, trans-2-octene, cis-3-octene and trans-3-octene.

The proportion of the amount of alpha-olefin and non-alpha olefin monomers in the olefin feed varies between 1-90% and 1-45% respectively.

In accordance with one of the embodiments of the present disclosure, the proportion of the amounts of 1-octene, cis-2-octene, trans-2-octene, cis-3-octene and trans-3-octene in the feed ranges between 45-75%, 8-22%, 8-25%, 2-5% and 2-6.25%, respectively.

One of the most challenging aspects in the oligomerization process of an olefin feed is oligomerization of non-alpha olefin monomer, particularly the cis and trans forms.

During the oligomerization process, conversion of different components of the olefin feed, particularly the alpha olefins and the non-alpha olefins (cis and transisomers) into polyoctene vary from each other. It is known in the art that di-substituted alkenes, for example 2-octene and 3-octene in the present case, are more stable as compared to mono-substituted alkenes such as 1-octene, therefore 2-octene and 3-octene present in the $C_8$ olefin feed of the present disclosure are less reactive than the mono-substituted 1-octene. Similarly, in case of di-substituted alkenes, the higher stability of trans-form of alkenes makes them less reactive as compared to cis-forms.

The inventors of the present disclosure particularly found that the poor oligomerization of non-alpha olefin monomer reduces the overall yield of the oligomerization process and produces polyoctene having branch ratio of 0.19. Accordingly, the present inventors sought to improve the overall yield and branch ratio by oligomerization of non-alpha olefin monomers. This is accomplished by controlling one or more reaction conditions during the reaction of the olefin feed with the help of the ionic catalyst.

The ionic catalyst as employed in accordance with the present disclosure contains a metal halide as a first component and one or more hydrocarbyl substituted ammonium halide, hydrocarbyl substituted imidazolium halide, hydrocarbyl substituted pyridinium halide, hydrocarbyl substituted phosphonium halide, alkylene substituted pyridinium-dihalide, alkyl substituted ammonium halide and alkyl substituted imidazolium halide as a second component. The proportion of the first component and the second component in the ionic catalyst is in the range of 1:1 to 5:1.

In one embodiment of the present disclosure the alkyl substituted ammonium halide is tri-methylamine hydrochloride.

In another embodiment of the present disclosure the alkyl substituted immidazolium halide is 1-ethyl-3-methyl-imidazolium chloride.

In accordance with the present disclosure the ionic catalyst contains aluminum trichloride as a first component and tri-methylamine hydrochloride as a second component.

While, reacting the $C_8$ olefin feed in a controlled manner with the help of the ionic catalyst and in accordance with the process of the present disclosure, a high exotherm is observed. The high exotherm if not controlled properly generally reaches to high values in the range of 180° C. The higher exotherm generally adversely affects the selectivity of the catalytic oligomerization resulting in poor oligomerization of non-alpha olefins, particularly, the trans-isomers.

In accordance with the process of the present disclosure, the exotherm generated during the method step of reacting the $C_8$ olefin feed with the help of ionic catalyst is maintained between 90° C. and 180° C., In another embodiment of the present disclosure, the exotherm generated during the method step of reacting the $C_8$ olefin feed with the help of ionic catalyst is maintained between 100° C. and 160° C.

In yet another embodiment of the present disclosure, the exotherm generated during the method step of reacting the $C_8$ olefin feed with the help of ionic catalyst is maintained below 130° C., since it plays a critical role in determining the selectivity of the present oligomerization reaction.

In accordance with the process of the present disclosure, the $C_8$ olefin feed is allowed to contact with the ionic catalyst for a time period varying between 2.5 hrs to 5.0 hrs.

It is observed by the present inventors that higher exotherm is highly favorable for oligomerization of trans-forms of octene. Similarly, increased contact time is also found to be highly favorable for the oligomerization of trans-form of octenes to corresponding polyoctene.

In accordance with one of the embodiments of the present disclosure, oligomerization of at least one non-alpha olefin monomer in cis-form is accomplished by maintaining the following reaction conditions:

i. exotherm varying between 100° C. and 130° C.;
ii. molar ratio of the ionic catalyst to the olefin feed varying between 0.01 and 0.1; and
iii. olefin feed contact time of 2.5 hrs.

In this embodiment, an oligomerized mixture obtained due to oligomerization of $C_8$ olefin monomer comprises at least 82 wt % of polyoctene.

The selectively higher oligomerization of monomers in cis-form however, leaves a fraction of un-reacted monomers in trans-form in the reaction mixture. These are further separated by distillation under vacuum.

In accordance with another embodiment of the present disclosure, oligomerization of at least one non-alpha olefin monomer in trans-form is accomplished by maintaining the following reaction conditions:
i. exotherm maintained between 125° C. and 160° C.;
ii. molar ratio of the ionic catalyst to the olefin feed varying between 0.01 and 0.1; and
iii. olefin feed contact time greater than 2.5 hrs.

In this embodiment, an oligomerized mixture obtained due to oligomerization of $C_8$ olefin monomer comprises 82 to 94 wt % of polyoctene. The polyoctene comprises carbon count varying in the range of 16 to 160.

In accordance with one of the embodiments of the present disclosure the carbon count of $C_8$ olefin polyoctene varies in the range of 32 to 150.

After completion of the reaction, the ionic catalyst is separated from the reaction mixture comprising the oligomerized product. As evidenced from the conversion data in accordance with the findings of the present disclosure the overall conversion of all the olefin monomers in the feed is at least 82 wt %.

The polyoctene as obtained by the process of the present disclosure is washed with saturated aqueous ammonium chloride solution to obtain a purified polyoctene. The ammonium salt used to wash polyoctene is selected from the group consisting of ammonium chloride, ammonium bromide and ammonium hydroxide.

The purified polyoctene of $C_8$ olefin prepared in accordance with the process of the present disclosure is further subjected a hydrogenation process to obtain a hydrogenated olefin polymer. The hydrogenation of the polyoctene is carried out in a high pressure reactor by using a hydrogenation catalyst. The hydrogenation catalyst is selected from the group which includes palladium on charcoal, palladium on silica or palladium on alumina.

The pressure reactor charged with the polyoctene and hydrogenation catalyst is heated to a temperature of 130° C. and pressurized to 35 bar. Every time when drop in hydrogen pressure is observed, the reactor is re-pressurized to 35 bar, until drop in pressure is stopped. At this point, the reactor is cooled and the hydrogenated olefin polymer product is filtered and analyzed.

The hydrogenated olefin polymer of formula (I) $(C_8H_{16})$ $nH_2$ which is obtained in accordance with the present disclosure is an oligomerized product of a $C_8$-olefin feed comprising an isomeric mixture of an alpha-olefin and a non-alpha olefin monomer, wherein said non-alpha olefin is selected from the group consisting of cis-2-octene, trans-2-octene, cis-3-octene and trans-3-octene and it is characterized by the following parameters.

A viscosity index greater than 130 at a branch ratio below 0.16; a kinematic viscosity ranging between 50 centistokes and 65 centistokes at a temperature of 40° C.; and a kinematic viscosity ranging between 7 centistokes and 10 centistokes at a temperature of 100° C.; a pour point temperature ranging between −36° C. and −42°; a bromine index ranging between 50 mgBr/100 g and 99.5 mgBr/100 g; a flash point temperature ranging between 150° and 250° C.; a percent short chain branching ranging between 20% and 30%, preferably 25% and 28%; and a polydispersity index ranging between 2 and 5.

In the present disclosure the hydrogenated olefin polymer is also characterized by having carbon count in the range of 16 to 160.

In the present disclosure the hydrogenated olefin polymer is further characterized by having carbon count in the range of 32 to 150.

The amount of the alpha-olefin is maintained in the range of 1% to 90% with respect to the total mass of the olefin feed.

The amount of non-alpha olefin is maintained in the range of 1% to 45% with respect to the total mass of the olefin feed.

The proportion of the amounts of alpha-olefin, cis-2-octene, trans-2-octene, cis-3-octene and trans-3-octene present in the feed ranges between 45-75%, 8-22%, 8-25%, 2-5% and 2-6.25%, respectively.

The hydrogenated olefin polymer as obtained by the process of the present disclosure finds its extensive end use applications as base oil in the cosmetic industry.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Example-1

Ionic catalyst (64 gm) and octene feed (1282 gm) were mixed in a 2 L metal reactor. The molar ratio of the ionic catalyst to the octene feed was maintained at 0.05. At the controlled exotherm of 129° C., the reaction was carried out for 2.5 hrs. After 2.5 hrs of reaction time, the sample from the reaction mixture was withdrawn for qualitative as well as quantitative analysis. The total oligomerization of olefin monomer (present in the octene feed) into a polyoctene was 82% with un-reacted octene 18%. The un-reacted octene consists of >83% trans-form of octene. In this example, most of the trans-isomer was found to remain un-reacted.

Example-2

The process was carried out in a similar manner as described in example-1. The ionic catalyst and octene feed was mixed in the molar ratio of 0.5 in a 2 L metal reactor. The octene feed and the ionic catalyst were allowed to contact at the controlled exotherm of about 134° C. for a time period of 2.5 h. After completion of the reaction the total oligomerization of olefin monomer (present in the octene feed) into a polyoctene was 85% with un-reacted octene 14%. The un-reacting octene consists of >85% trans-isomer i.e. most of the trans-isomer was found to remain un-reacted.

Example 3

In this example, ionic catalyst and octene feed were mixed in a molar ratio of 0.035. For this, 2800 g of octene was mixed with 98 g of ionic catalyst in a 5 L metal reactor. The exotherm during this experiment was maintained at 154° C. Similar to example-1 and 2, the reaction was carried out for 2.5 h. After 2.5 hrs of reaction time, the total oligomerization of olefin monomer (present in the octene feed) into a polyoctene was 92% with the un-reacted octene 7% wherein un-reacted octene consists of >93% trans-isomer. From the provided results it can be deducted that a significant amount of trans-isomers were also consumed in this experiment.

Example 4

In a 5 L metal reactor, 98 g of ionic catalyst and 2800 g of octene were mixed in the molar ratio of 0.035. The reaction was carried out at the controlled exotherm of 128° C. and for a time period of 2.5 h. After 2.5 hrs of reaction time, the total oligomerization of olefin monomer (present in the octene feed) into a polyoctene was 85% with the un-reacted octene of 14% consisting of >85% trans-isomer. Most of the trans-isomer was found to remain un-reacted.

Example 5

In a 500 ml round bottom flask, 5 g of ionic catalyst and 100 g of octene in the molar ratio of 0.05 were mixed. The reaction mixture thus obtained was heated on an oil bath at a temperature of 50° C. The exotherm was preferable maintained below 100° C. The reaction was sampled at 2.5 hrs and 5 hrs. The total conversion recorded after 2.5 hrs of reaction time was 84% with 13.5% un-reacted octene. The trans-form of octene was found to be >85% i.e. most of the trans-isomers was found to remain un-reacted after 2.5 hrs of reaction time. The sample at 5 h shows the total oligomerization of olefin monomer (present in the octene feed) into a polyoctene was 92% with 7% un-reacted octene consisting of trans-isomers higher than 93%. That means a significant part of the trans-isomers was consumed in the later case.

The percent conversion of octene feed and product selectivity is calculated for each of above described examples is tabulated herein below as follows:

TABLE 1

Percent conversion and product selectivity

| Example | Reaction Time in Hours | Octene feed (g) | Ionic catalyst (g) | Ionic catalyst:octene ratio | Conversion, % | Product distribution, % | | | |
|---|---|---|---|---|---|---|---|---|---|
| | | | | | | $C_8$ | $C_{16}$ | $C_{24}$ | $>C_{30}$ |
| 1 | 2.5 | 1282 | 64 | 0.050 | 82 | 18 | 2 | 2 | 78 |
| 2 | 2.5 | 1290 | 64 | 0.050 | 85 | 14 | 2 | 2 | 82 |
| 3 | 2.5 | 2800 | 98 | 0.035 | 92 | 7 | 4 | 6 | 83 |
| 4 | 2.5 | 2800 | 98 | 0.035 | 85 | 14 | 4 | 6 | 75 |
| 5 | 2.5 | 100 | 5 | 0.05 | 84 | 16 | 3 | 8 | 72 |
| | 5 | 100 | 5 | 0.05 | 92 | 7 | 3 | 12 | 78 |

The compositional analysis of the octene feed as employed for the purpose of the present disclosure is tabulated in herein below as follows:

TABLE 2

| Description | SH (%) | FC-1 (%) | Trans-3 (%) | Trans-2 (%) | Cis-3 (%) | Cis-2 (%) | Grease (%) | Others (%) | Total |
|---|---|---|---|---|---|---|---|---|---|
| Polyethylene column residue | 0.0 | 50.29 | 5.9 | 13.14 | 4.2 | 19.44 | 3.1 | 3.93 | 100 |

Example-6

This example describes a process for the hydrogenation of polyoctene as obtained in example-1, 2, 3, 4 and 5.

The polyoctene obtained in accordance with the process of above described examples was taken in a high pressure reactor and mixed with the hydrogenation catalyst having 5 wt % Pd on carbon to obtain a reaction mixture. The pressure reactor filled with the reaction mixture was heated to 130° C. and pressurized to 35 bar. Every time the drop in hydrogen pressure was observed, the reactor was re-pressurized to 35 bar. This was continued till drop in pressure stopped. At this point the reactor was cooled and the obtained reaction mixture comprising the hydrogenated product was removed, filtered and analyzed.

The hydrogenation of polyoctene obtained from example-1, 2, 3, 4 and 5 is carried out separately to obtain a hydrogenated olefin polymer, the details of which are provided in Table-3

TABLE 3

| Exp. No. | Polyoctene (g) | Catalyst Pd/C | Hydrogenated olefin polymer (g) | Bromine Index (mgBr/100 g) | Mass balance |
|---|---|---|---|---|---|
| 1 | 905 | 4.5 g | 904 | 99 | 1.00 |
| 2 | 968 | 3.5 g | 959 | 53 | 0.99 |
| 3 | 2090 | 3.0 g | 2087 | 98 | 0.99 |
| 4 | 1912 | 3.0 g | 1910 | 66 | 0.99 |

Figure 2:
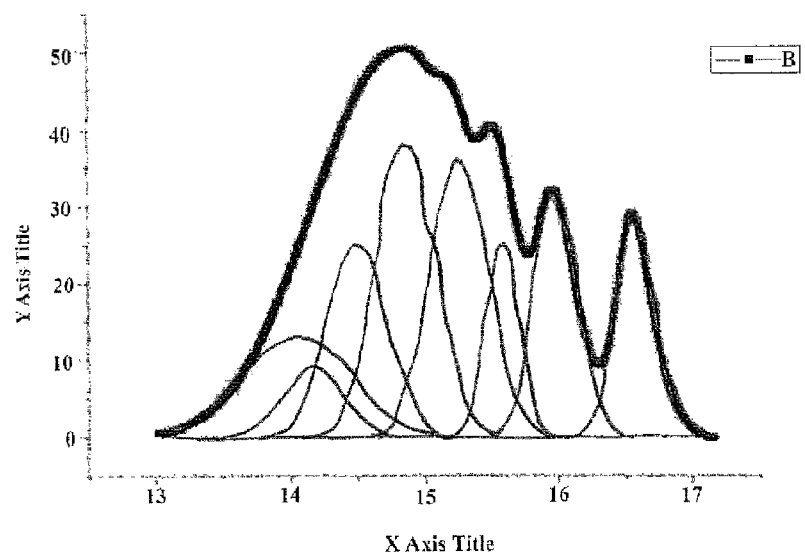
FIG. 2 illustrates a gas permeation chromatography (GPC) to obtain the ratio of the trimers, tetramers, pentamers, hexamers and higher components in the hydrogenated olefin polymer of the present disclosure.

Characterization of the Hydrogenated Olefin Polymer:
Gel Permeation Chromatography (GPC):
GPC Analysis was Carried Out in Two Different Modes;
1) A simple GPC analysis was carried out to obtain a number avg. molecular weight per mass (Mn), a weight avg. molecular weight per mass (Mw) and poly-dispersity index (PDI) data by using a mixed bead column with tetrahydofuran (THF) as a solvent. (FIG. 1 and Table 4)
2) GPC analysis was carried out using three Styragel HR 1 columns in series to obtain complete separation of the individual components in the hydrogenated poly octene. The profile obtained was de-convoluted to obtain exact area percentages of the individual components which provides the ratio of the trimers, tetramers, pentamers, hexamers and higher components in the hydrogenated poly octene. (FIG. 2)

Figure 3:
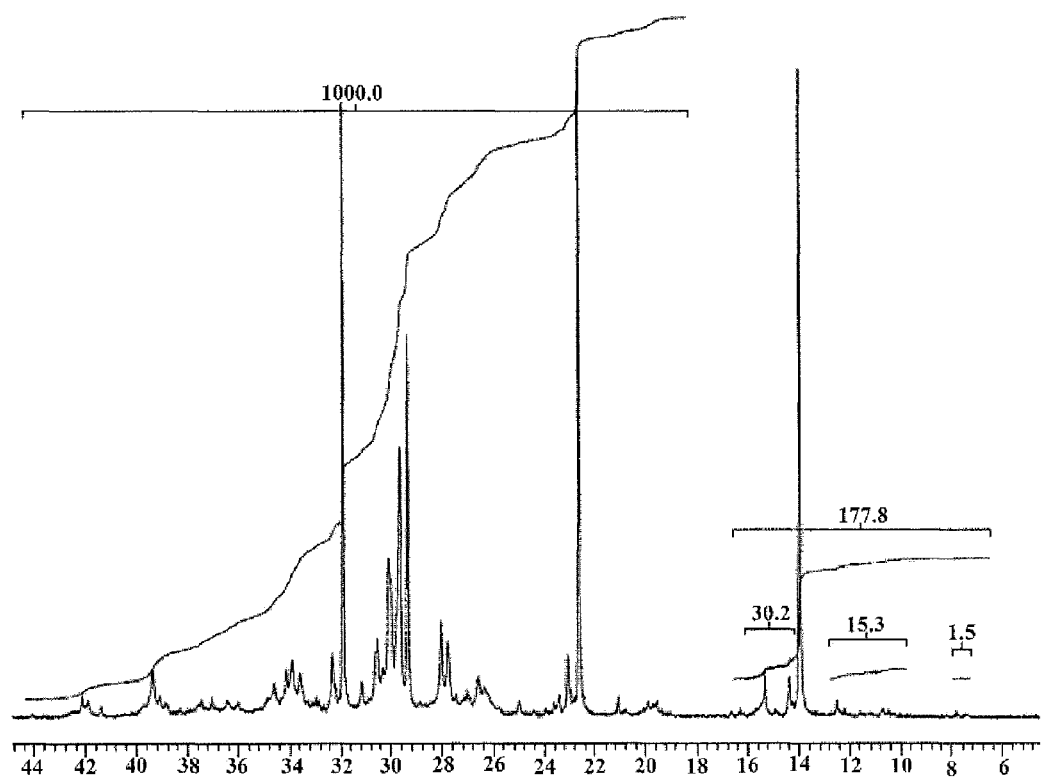
FIG. 3 illustrates $^{13}C$ NMR analysis of the hydrogenated olefin polymer of the present disclosure.

Quantitative $^{13}$C NMR Analysis:

Quantitative $^{13}$C NMR analysis was carried out for the hydrogenated olefin polymer sample to evaluate its short chain branching and the branch ratio. About 100 mg of the sample was dissolved in deuterated chloroform (CDCl$_3$) containing 0.03M Chromium (III) acetylacetonate (Cr(acac)$_3$). The sample was recorded using inverse gated pulse program with 90 degree pulse and 7 seconds delay until the signal to noise of the smallest peak was greater than 10 effectively greater than 7000 scans were recorded. (FIG. 3)

Figure 4:
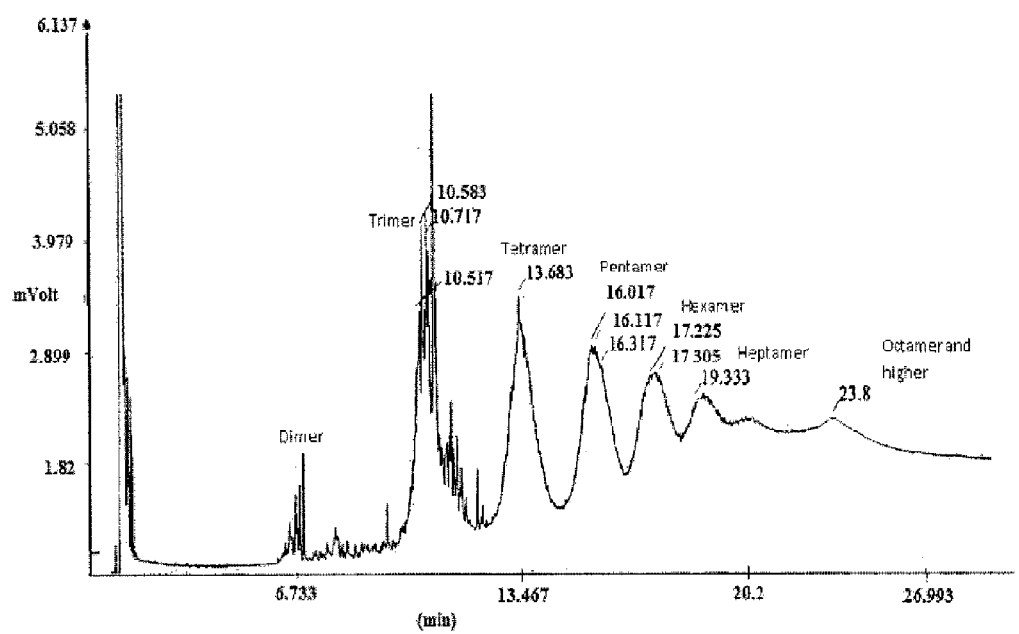
FIG. 4 illustrates gas chromatography (GC) analysis of the hydrogenated olefin polymer of the present disclosure.
Figure 5:
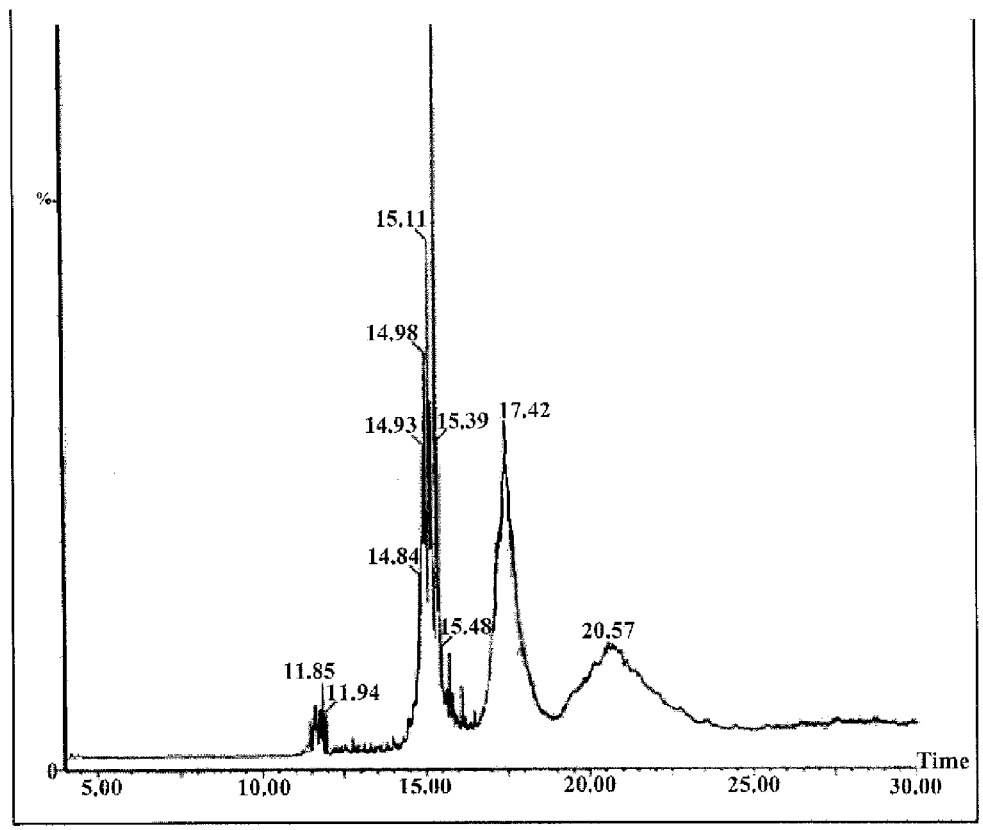
FIG. 5 illustrates GCMS analysis of the hydrogenated olefin polymer of the present disclosure.
Figure 6:
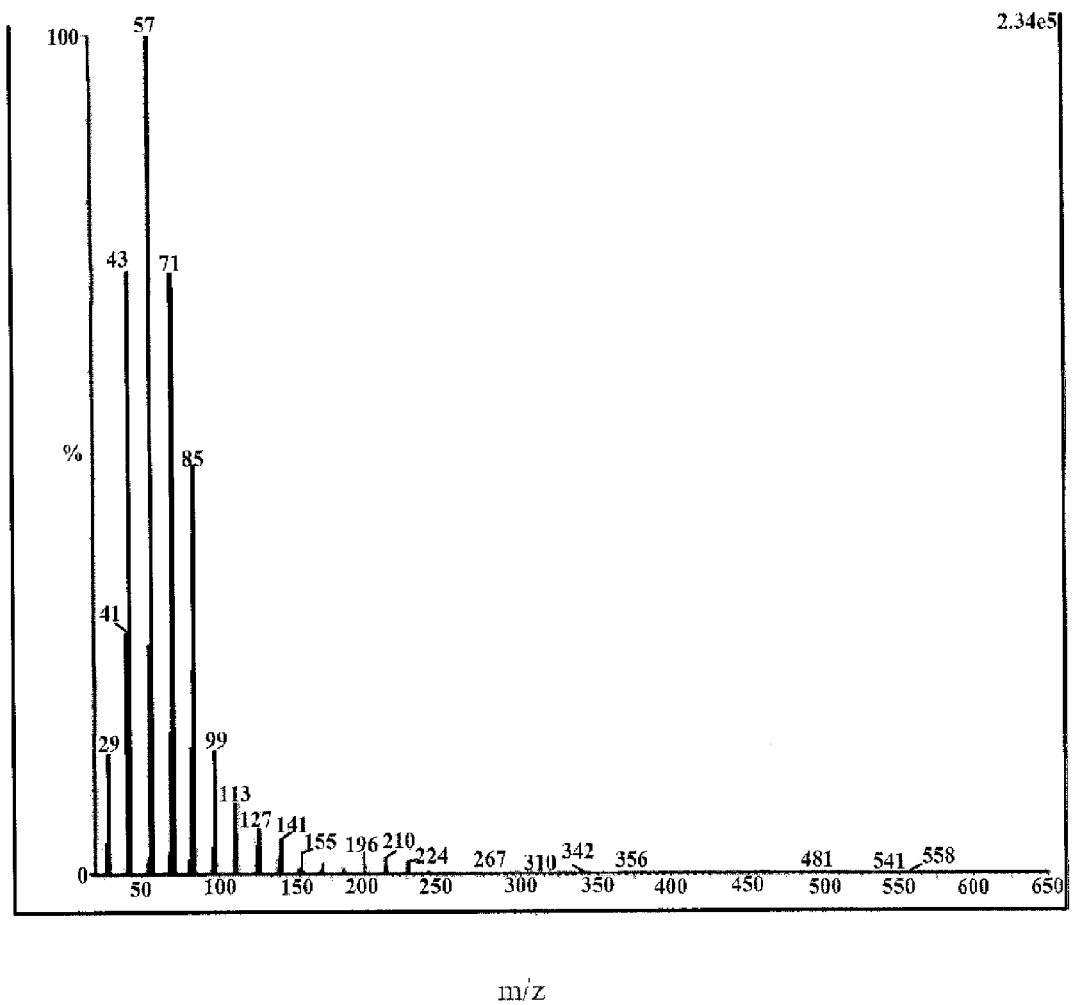
FIG. 6 illustrates GCMS analysis of the hydrogenated olefin polymer of formula $C_{24}H_{50}$.
Figure 7:
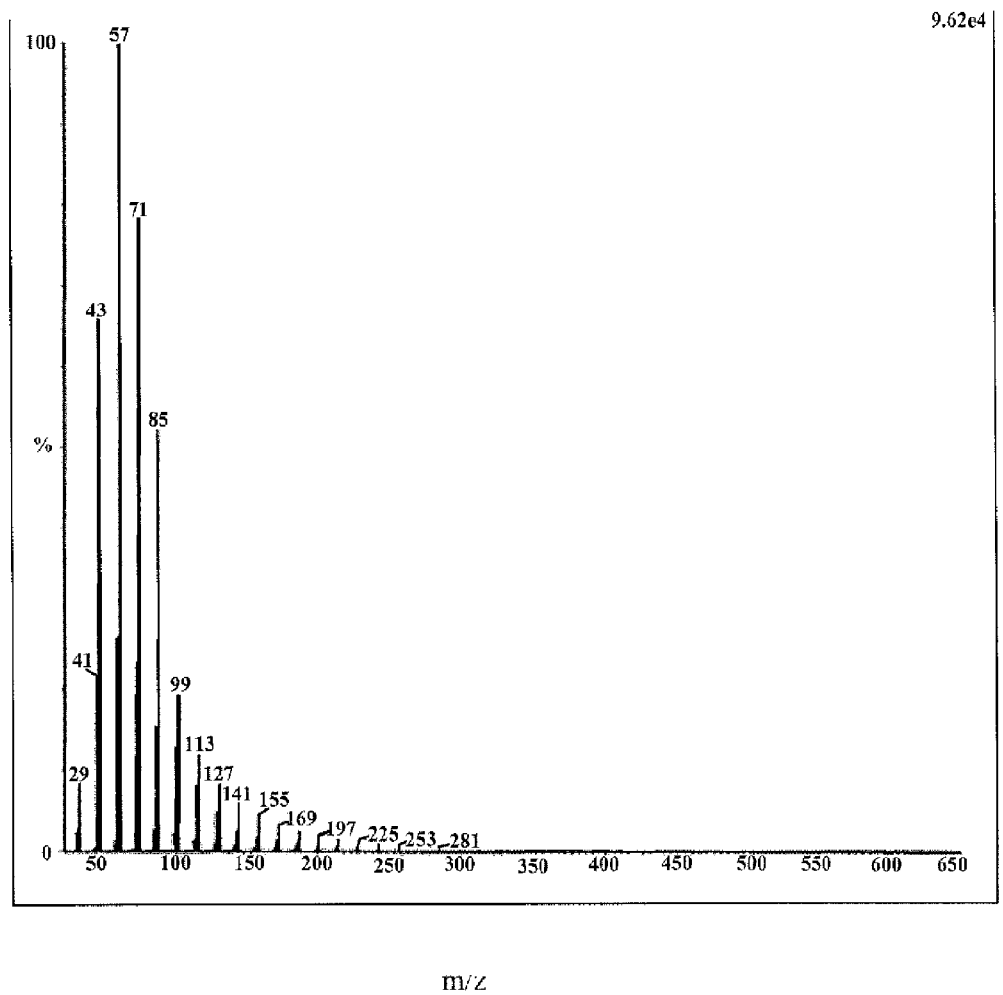
FIG. 7 illustrates GCMS analysis of the hydrogenated olefin polymer of formula $C_{32}H_{66}$.
Figure 8:
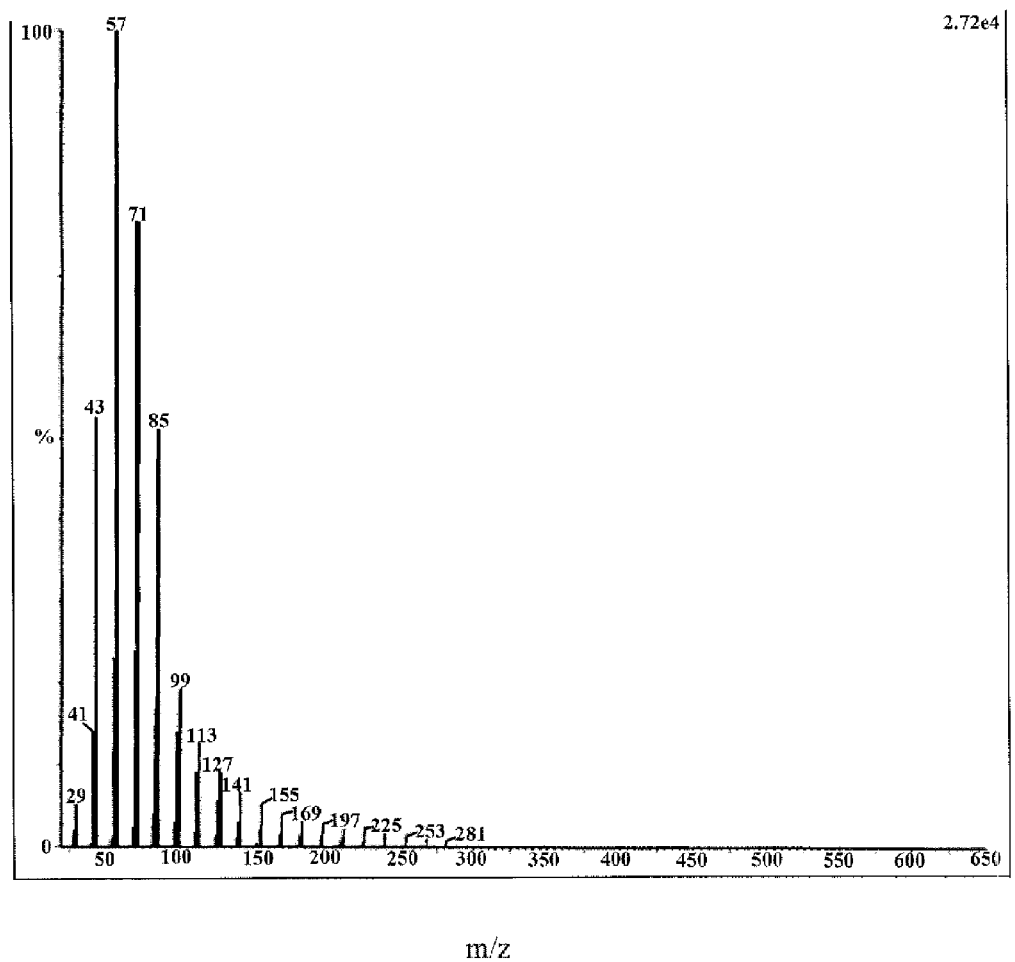
FIG. 8 illustrates GCMS analysis of the hydrogenated olefin polymer of formula $C_{50}H_{82}$.

GC and GCMS Analysis of the Hydrogenated Olefin Polymer:

High temperature GC analysis was carried out on the hydrogenated olefin polymer using a 15 m ZB-1HT column from Phenomenex and heating the column at a temperature of 400° C. (FIG. 4), which was then used for GCMS analysis by using a DB-1 column on a quadrapole GCMS. The GC chromatogram of the TIC and the subsequent library matches for the 3 peaks obtained is shown. The data clearly indicates that the hydrogenated polyoctene are separated by a mass difference of 112 or $C_8H_{16}$ units.

TABLE 4

The properties of the hydrogenated olefin polymer as obtained in example-6 are tabulated as follows:

| Product | Example 1 | Example 2 | Example 3 |
|---|---|---|---|
| Density | 0.83 | 0.83 | 0.83 |
| Bromine Index mgBr/100 g | 99 | 53 | 98 |
| Flash Point ° C. | 208 | 213 | 210 |
| Color APHA | <10 | <10 | <10 |
| Viscosity @ 40° C. cSt | 56.5 | 60.1 | 55.4 |
| Viscosity ® 100° C. cSt | 9.9 | 9.4 | 8.6 |
| Viscosity Index | 162 | 137 | 130 |
| Pour point ° C. | 36 to −39 | | −36 to −39 |
| Mw | 895 | 882 | 951 |
| Mn | 324 | 285 | 469 |
| PDI | 2.76 | 3.10 | 2.02 |

TABLE 5

Structural Properties of the hydrogenated polyoctenes obtained in Example 1 and Example 2 and their comparison against hydrogenated polydecene:

| Parameter | Example 1 | Example 2 | Polydecene |
|---|---|---|---|
| Branch Ratio | 0.160 | 0.143 | 0.143 |
| Percent short chain branching | 26.4 | 27 | 23.6 |
| No of methyl groups | 12 | 12 | >6 |

TABLE 6

Detailed molecular weight analysis of the hydrogenated olefin polymer obtained in Example 1 and 2

| Mol. Weight | Example 1 | Example 2 |
|---|---|---|
| C20-C29 | 9.9 | 11.8 |
| C30-C39 | 12.8 | 14.1 |
| C40-C49 | 26 | 27.5 |
| C50+ | 50.8 | 46.3 |

Technical Advantages:

The present disclosure related to a process for preparing an olefin polymer by oligomerizing octene in the presence of an ionic catalyst to obtain an oligomer of octene followed by hydrogenating the same, have the following technical advantages:

(1) Value addition to the olefin waste feed generated at the polyethylene production plant, (2) Complete removal of aluminum from the oligomer product by washing with aqueous ammonium chloride, (3) Re-use of the ionic catalyst after completion of the reaction, and Providing an oligomer product to be used as base oil by the cosmetic industries.

(4) Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

"Whenever a range of values is specified, a value up to 10% below and above the lowest and highest numerical value respectively, of the specified range, is included in the scope of the present disclosure".

While considerable emphasis has been placed herein on the particular features of the present disclosure, it will be appreciated that various modifications can be made, and that many changes can be made in the preferred embodiments without departing from the principle of the present disclosure. These and other modifications in the nature of the present disclosure or the preferred embodiments will be apparent to those skilled in the art from the disclosure herein, whereby it is to be distinctly understood that the foregoing descriptive matter is to be interpreted merely as illustrative of the present disclosure and not as a limitation. The numerical values mentioned for the various physical parameters, dimensions or quantities are only approximations and it is envisaged that the values higher/lower than the numerical values assigned to the parameters, dimensions or quantities fall within the scope of the present disclosure, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A process for preparing a hydrogenated olefin polymer of Formula (I);

$$(C_8H_{16})_nH_2 \quad \text{Formula (I)}$$

wherein, n=2 to 40;

said process comprising the following steps;

i. reacting a $C_8$-olefin feed comprising an isomeric mixture of a $C_8$-alpha-olefin and a $C_8$-non-alpha olefin monomer in a controlled manner in the presence of an ionic catalyst, while controlling at least one condition of the reaction selected from the group of conditions consisting of exotherm, contact time of the olefin feed with the ionic catalyst and molar ratio of the ionic catalyst to the olefin feed within predetermined ranges to obtain an oligomerized mixture comprising at least one polyoctene and unreacted ionic catalyst;

ii. separating the polyoctene from the oligomerized mixture to obtain a separated polyoctene;

iii. purifying the separated polyoctene using an ammonium salt to obtain a purified polyoctene; and iv. hydrogenating the purified polyoctene in the presence of a hydrogenation catalyst to obtain a hydrogenated olefin polymer of Formula (I).

2. The process as claimed in claim 1, wherein the $C_8$-non-alpha olefin is at least one selected from the group consisting of cis-2-octene, trans-2-octene, cis-3-octene and trans-3-octene.

3. The process as claimed in claim 1, wherein the $C_8$-olefin feed comprises, with respect to the total mass of the olefin feed:
  a. the alpha-olefin present in an amount ranges between 1% and 90%;
  b. cis-2-octene in an amount ranges between 8% to 22%;
  c. trans-2-octene in an amount ranges between 8% to 25%;
  d. cis-3-octene in an amount ranges between 2% to 5%; and
  e. trans-3-octene in an amount ranges between 2% to 6.25%.

4. The process as claimed in claim 1,
wherein the ionic catalyst comprises a first component and a second component; wherein the first component is at least one metal halide; and
wherein the second component is at least one selected from the group consisting of hydrocarbyl substituted ammonium halide, hydrocarbyl substituted imidazolium halide, hydrocarbyl substituted pyridinium halide, hydrocarbyl substituted phosphonium halide, alkylene substituted pyridinium dihalide, alkyl substituted ammonium halide and alkyl substituted imidazolium halide.

5. The process as claimed in claim 4, wherein the alkyl substituted ammonium halide is tri-methylamine hydrochloride and wherein the alkyl substituted imidazolium halide is 1-ethyl-3-methyl-imidazolium chloride.

6. The process as claimed in claim 4, wherein the ratio of the amount of the first component and the second component ranges between 1:1 and 5:1.

7. The process as claimed in claim 1, wherein the ionic catalyst comprises aluminum trichloride as a first component and tri-methylamine hydrochloride as a second component.

8. The process as claimed in claim 1, wherein the molar ratio of the olefin feed and the ionic catalyst ranges between 1:0.01 and 1:0.1.

9. The process as claimed in claim 1, wherein the exotherm is maintained at a temperature ranging between 90° C. and 180° C.

10. The process as claimed in claim 1, wherein the contact time of the olefin feed with the ionic catalyst is maintained in the range of 2 to 5 hrs.

11. The process as claimed in claim 1, wherein the oligomerized mixture comprises at least one polyoctene having carbon count in the range of 16 to 160.

12. The process as claimed in claim 1, wherein the oligomerized mixture comprises polyoctene in the range of 82 to 94 wt %.

13. The process as claimed in claim 1, wherein the ammonium salt is at least one salt selected from the group consisting of ammonium chloride, ammonium bromide and ammonium hydroxide.

14. The process as claimed in claim 1, wherein the hydrogenation comprises a step of reacting the purified polyoctene with a hydrogenation catalyst at a temperature of 130° C. and pressure of 35 bar.

15. The process as claimed in claim 1, wherein the hydrogenation catalyst is at least one catalyst selected from the group consisting of palladium on charcoal, palladium on silica, and palladium on alumina.

16. The process as claimed in claim 1, wherein the hydrogenated olefin polymer is characterized by the following parameters:
  i. a viscosity index greater than 130 at a branch ratio below 0.16;
  ii. a kinematic viscosity ranging between 50 centistokes and 65 centistokes at a temperature of 40° C.; and a kinematic viscosity ranging between 7 centistokes and 10 centistokes at a temperature of 100° C.;
  iii. a pour point temperature ranging between −36° C. and −42° C.;
  iv. a bromine index ranging between 50 mg of $Br_2$/100 g and 99.5 mg of $Br_2$/100 g;
  v. a flash point temperature ranging between 150° C. and 250° C.;
  vi. a percent short chain branching ranging between 20% and 30%; and
  vii. a polydispersity index ranging between 2 and 5.

17. The process as claimed in claim 1, wherein the hydrogenated olefin polymer is characterized by having carbon count in the range of 16 to 160.

18. The process as claimed in claim 1, wherein the hydrogenated olefin polymer is characterized by the following parameters:
  i. a kinematic viscosity ranging between 55 centistokes and 61 centistokes at a temperature of 40° C., and a kinematic viscosity ranging between 8 centistokes and 9.9 centistokes at a temperature of 100° C.;
  ii. a bromine index ranging between 96 mg of $Br_2$/100 g and 99 mg of $Br_2$/100 g; and
  iii. a percent short chain branching ranging between 25% and 28%.

* * * * *